United States Patent
Koenig

(10) Patent No.: US 7,595,942 B2
(45) Date of Patent: Sep. 29, 2009

(54) LIGHT COLLIMATING SYSTEM FOR SCHMIDT-CASSEGRAIN TELESCOPE

(76) Inventor: Dean B. Koenig, 1049 W. Eagle Look La., Oro Valley, AZ (US) 85737

( * ) Notice: Subject to any disclaimer, the term of this patent is extended or adjusted under 35 U.S.C. 154(b) by 0 days.

(21) Appl. No.: 12/041,433

(22) Filed: Mar. 3, 2008

(65) Prior Publication Data
US 2008/0252964 A1    Oct. 16, 2008

Related U.S. Application Data

(60) Provisional application No. 60/892,815, filed on Mar. 2, 2007.

(51) Int. Cl.
*G02B 7/02* (2006.01)
*G02B 23/00* (2006.01)
(52) U.S. Cl. ............ 359/819; 359/430
(58) Field of Classification Search ......... 359/819–822, 359/429, 430, 399
See application file for complete search history.

(56) References Cited

U.S. PATENT DOCUMENTS

| | | | |
|---|---|---|---|
| RE29,878 E | 1/1979 | Johnson et al. | |
| 4,470,672 A * | 9/1984 | Drauglis | 359/430 |
| 4,576,452 A | 3/1986 | Abel et al. | |
| 4,718,753 A * | 1/1988 | Gebelein | 359/364 |
| 5,053,794 A | 10/1991 | Benz | |
| 5,471,346 A | 11/1995 | Ames | |
| 6,587,265 B1 | 7/2003 | Endoh | |
| 6,717,655 B2 | 4/2004 | Cheng et al. | |
| 6,717,727 B2 | 4/2004 | Barziza | |
| 6,763,196 B2 * | 7/2004 | Yafuso | 398/156 |
| 7,027,219 B2 | 4/2006 | Gatton | |
| 2003/0053204 A1 | 3/2003 | Wise | |

* cited by examiner

*Primary Examiner*—Mohammed Hasan
(74) *Attorney, Agent, or Firm*—Hayes Soloway P.C.

(57) ABSTRACT

Disclosed is a light collimating system for mounting at the primary focus of a Schmidt-Cassegrain telescope (SCT) in place of the secondary mirror. The system comprises a housing containing a plurality of lens elements optimized to reduce optical aberrations. The resulting system has a focal ratio of approximately f/2, a short exposure time for optical imaging, and a wide field of view with very little distortion. The housing is attached to the corrector plate of the SCT by a pair of rings held together by a plurality of screws that further facilitate the alignment and rotation of the light collimating system.

16 Claims, 15 Drawing Sheets

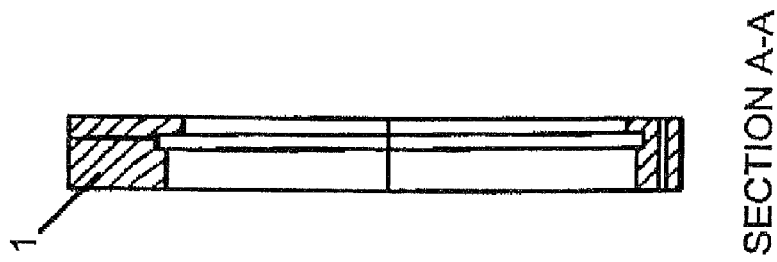
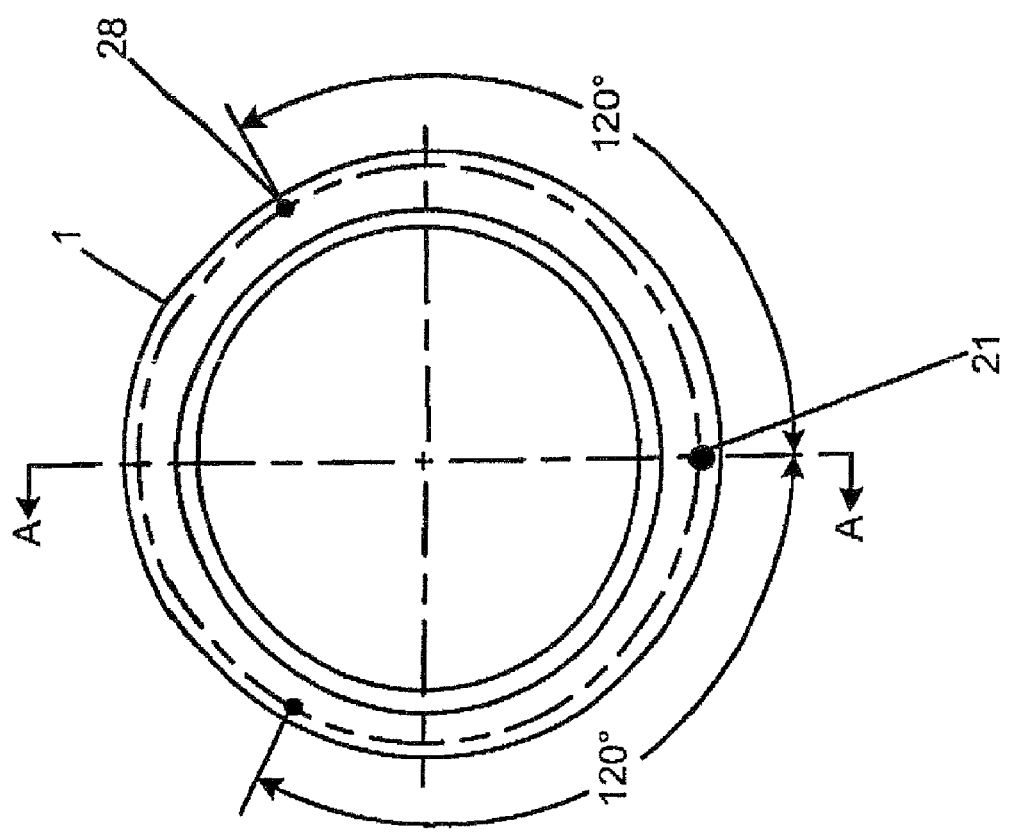
FIG. 5B
FIG. 5A

SECTION A-A

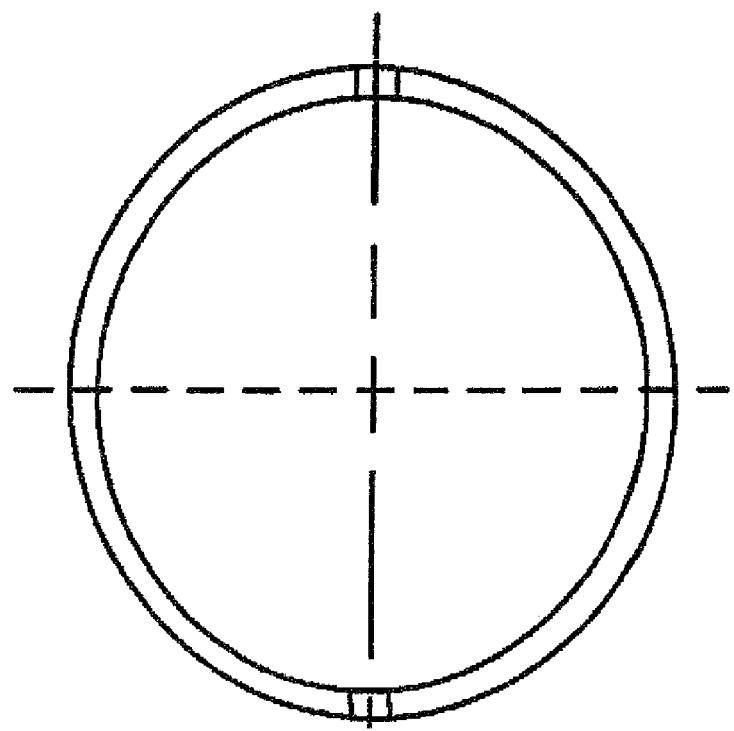
FIG. 9B
FIG. 9A

LIGHT COLLIMATING SYSTEM FOR SCHMIDT-CASSEGRAIN TELESCOPE

CROSS REFERENCE TO RELATED APPLICATION

This application claims priority from U.S. Provisional Application Ser. No. 60/892,815, filed Mar. 2, 2007, the contents of which are incorporated herein by reference.

FIELD OF THE INVENTION

This invention relates generally to optical imaging systems, and more particularly to improvements in wide field of view optical systems having a Schmidt-Cassegrain configuration.

BACKGROUND OF THE INVENTION

Schmidt and Schmidt-Cassegrain optical design systems are well known methods of achieving wide field of view optical imaging which are particularly desirable because they use primarily reflective elements. In a Schmidt system, a reflective spherical mirror focuses energy from a scene of interest onto a spherical focal surface. To correct for spherical aberration introduced by the spherical mirror, an aspheric refractive corrector plate ("Schmidt plate") is placed at the center of curvature of the spherical mirror. Because of its simplicity, a Schmidt system is relatively easily aligned.

In a Schmidt-Cassegrain system, a second curved reflective element is placed between the primary spherical mirror and the focal surface of a simple Schmidt system, in order to produce an optical system which has a flat focal plane and is more compact, and which retains the basic correction capacity and other advantages of the Schmidt system.

A basic Schmidt-Cassegrain telescope is illustrated in FIG. 1. While there are many variations, (both mirrors spherical, both mirrors aspherical, or one of each) they can be divided into two principal design forms: compact and non-compact. In the compact form, the corrector plate is located at or near the focus of the primary mirror. In the non-compact, and as shown in FIG. 1, the corrector plate 42 remains at or near the center of curvature (twice the focal length) of the primary mirror 40.

One very well-constructed design example would be the concentric (or monocentric) Schmidt-Cassegrain, where all the mirror surfaces and the focal surface are concentric to a single point: the center of curvature of the primary. Optically, non-compact designs often yield better aberration correction and a flatter field than a compact design, but at the expense of longer tube length.

Schmidt-Cassegrain telescopes have several limitations. First, higher order (oblique) spherical aberration will limit the field of view which can be utilized without image degradation, even if monochromatic light is used. Second, at narrower fields of view, the image quality is limited by spherochromatism (spherical aberration caused by variation of wavelength in the incident light), which can be reduced by addition of a second plate of different material (an "achromatic corrector plate") at the center of curvature of the spherical mirror.

In a number of applications requiring broader spectral coverage, the difficulty in correcting chromatic aberration, and the limitations in materials tend to reduce the effectiveness of the Schmidt plate correction concept. As a result, systems requiring broad band coverage and wide field of views have tended to use purely reflective designs (which eliminate the problem of chromatic aberration). Some of these systems use the Schmidt principle, with the aspheric deformation applied to a mirror, rather than to refractive plate. These systems generally involve off-axis apertures and/or off-axis fields of view, resulting in relatively larger system sizes. In all cases however, the aspheric surface has been rotationally symmetric, whether placed on a flat or curved folding mirror. For a detailed description of these prior design concepts, see I. R. Abel and M. R. Hatch, "The Pursuit of Symmetry in Wide-Angle Reflective Optical Design," Proc. 1980 International Lens Design Conference, SPIE Vol. 237, p. 271 (1980).

The foregoing discussion of the prior art derives primarily from U.S. Pat. No. 4,576,452 which proposes to utilize in a reflective Schmidt or Schmidt-Cassegrain system configuration a corrector mirror in the form of a tilted nonrotationally symmetric aspherized mirror placed between the optical system and the target of interest, generally at or near the center of curvature of the primary focusing mirror. According to the inventors, the corrector mirror encodes both the correction for traditional aberrations associated with the Schmidt designs, as well as the wavefront error introduced by tilting the fold mirror.

One way to enlarge the field of view is to use a camera with a larger sensor, but these are very expensive. Another way is to use a telescope with a shorter focal length, such as a refractor, but these are generally much smaller telescopes. Further, high quality refractor telescopes suitable for imaging can be quite expensive, and their smaller apertures restrict the resolution and limiting magnitude of the system. Finally, the focal ratio of a small refractor is typically f/5 to f/7, but still long enough to require an equatorial mount and guide camera.

Even with a larger sensor in the camera, there are many potential issues remaining. For instance, many telescopes do not produce sharp stars very far off axis. Most SCTs experience coma, and all SCTs have field curvature. Thus, while the field of view might be reasonably large with a big sensor, the star images will not be ideal.

The amount of sky one can capture in an image is partially dependent on the focal length of the telescope used and the size of the sensor in the camera. A big field of view is a definite advantage because most deep-sky objects are quite large.

One solution is to collect image data at the focal point of the primary mirror (prime focus). A typical Schmidt-Cassegrain telescope uses a primary mirror which has a focal ratio of around f/2 and a secondary mirror which provides a 5× magnification, yielding an overall focal ratio of f/10. Because of the focal length, the amount of exposure time required to collect enough light for a useful image necessitates polar alignment and the guiding of the SCT to follow the target across the sky as the earth rotates. Removal of the secondary mirror converts the telescope to a focal ratio of approximately f/2. Because the exposure time required for this focal length is much shorter, the telescope does not need to be polar aligned, nor is guiding necessary. The magnification lost in the secondary mirror is not useful for viewing unresolved objects such as stars.

U.S. Pat. No. 6,587,265 suggests collecting data at the prime focus of a telescope. The system used in this prior art reference is large and complex, being designed primarily for very large telescopes. Because of the large size and weight, the system includes an adjustment mechanism to correct the relative position of the apparatus as the telescope moves. This adjustment mechanism, which comprises a series of six jacks called a Stewart platform, adds to the complexity of the system.

Moreover, the prior art includes no means for correcting optical aberrations that may occur as a result of the primary mirror. Removal of the secondary mirror, without providing a corrective lens, produces very poor images at the prime focus. The primary mirror alone generally suffers from spherical aberration and field curvature which is normally minimized by the secondary mirror.

SUMMARY OF THE INVENTION

The present invention provides light collimating optical system which replaces the secondary mirror at the front end of a Schmidt-Cassegrain telescope (SCT). The optical system of the present invention, as seen in FIG. 2, comprises multiple lens elements that may be customized for a specific Schmidt-Cassegrain design contained within a housing having a simple alignment design. Moreover, these lens elements correct the inherent aberrations in the telescope, allowing focal ratios of approximately f/2 or f/1.8 with a highly-corrected field of view.

The present invention works with Schmidt-Cassegrain telescopes and is particularly well-suited for such telescopes in which the secondary mirror may be easily removed and replaced with the apparatus of the present invention.

One advantage of the present invention is the increased field of view. The optical system of the present invention corrects for aberrations such as coma and field curvature, producing a very wide field of view with very sharp stars across the entire field. The result is a wider field of view, even with a small camera, and finer star images.

Another advantage of the present invention is the potential for unguided imaging. Long exposures usually require a telescope to be guided due to inherent tracking errors in the drive. This requires a second camera or self-guiding camera and often other hardware such as a guidescope. Because the necessary exposure time is much lower for telescopes equipped with the light collimating system of the present invention, guiding, and related hardware are not required. In addition, the present invention makes it possible to image with a telescope in alt-azimuth mode. This means it is possible to capture deep-sky images with a fork-mounted SCT without the need for an equatorial wedge. In addition to cost, this saves the trouble of mounting the scope on a wedge and having to polar align the telescope.

DESCRIPTION OF THE DRAWINGS

Further features and advantages of the present invention will be seen from the following detailed description, taking in conjunction with the accompanying drawings, wherein:

FIGS. 5A and 5B are end and side cross-sectional views of a mounting ring element;

FIGS. 9A and 9B are end and side cross-sectional views of a primary lens retainer element;

DETAILED DESCRIPTION OF PREFERRED EMBODIMENTS

The present invention provides a light collimating system that replaces the secondary mirror at the primary focus of a Schmidt-Cassegrain telescope (SCT). A key to the present invention involves a simple, easy to use, adjustable collimating lens assembly that permits both rotational and tilt adjustments to correct alignment errors.

Figure 1:
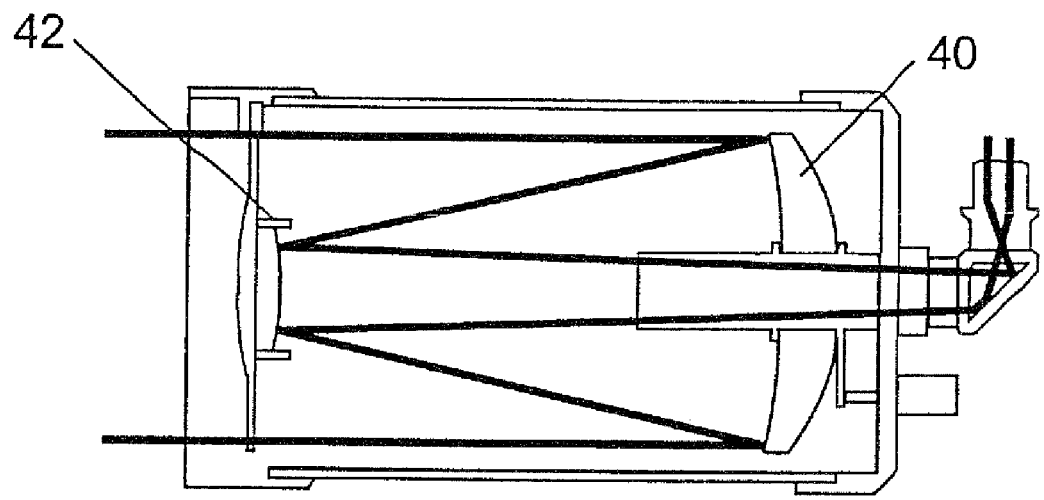
FIG. 1 schematically illustrates a conventional Schmidt-Cassegrain telescope.
Figure 2:
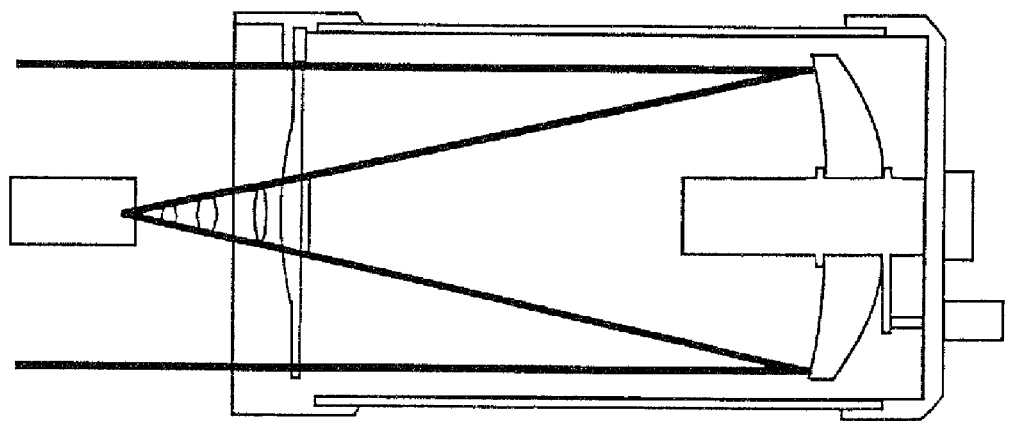
FIG. 2 schematically illustrates a Schmidt-Cassegrain telescope with a light collimating system of the present invention mounted thereon.
Figure 3:
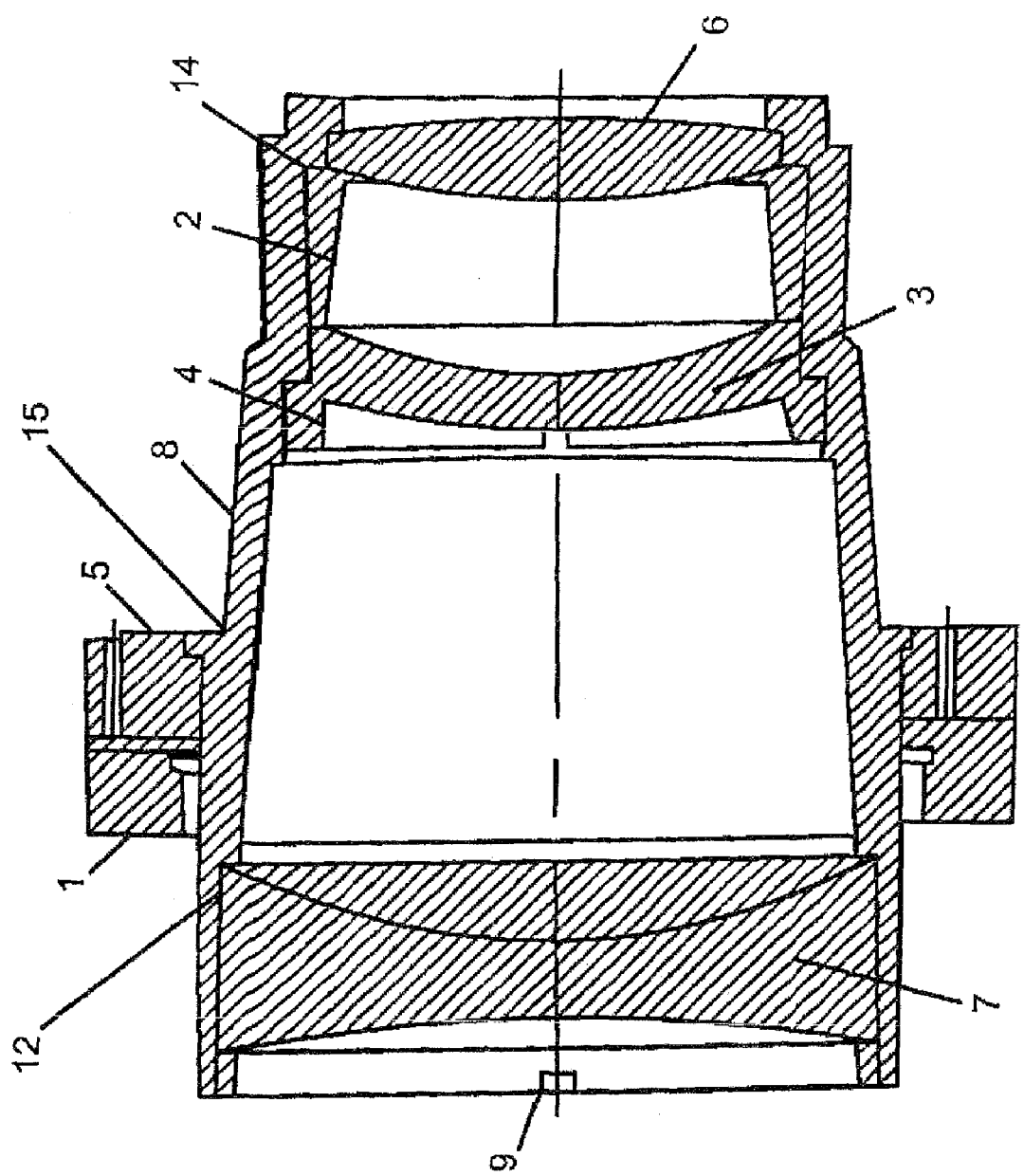
FIG. 3 is a cross-sectional view of the light collimating system of the present invention.

Referring to the FIGS. 3 and 4, a light collimating system includes a housing 8 in which is mounted an optical lens assembly as will be described in detail later. The housing 8 comprises a generally conically-shaped body rotatably mounted in an adapter ring 5. Adapter ring 5 in turn is mounted to a mounting ring 1 via pull screws 20 that extend through holes 27 in adapter ring 5 where they are threadedly mounted into threaded holes 28 in mounting ring 1, which are shown in detail in FIGS. 5A, 5B, 6A and 6B.

Figure 4:
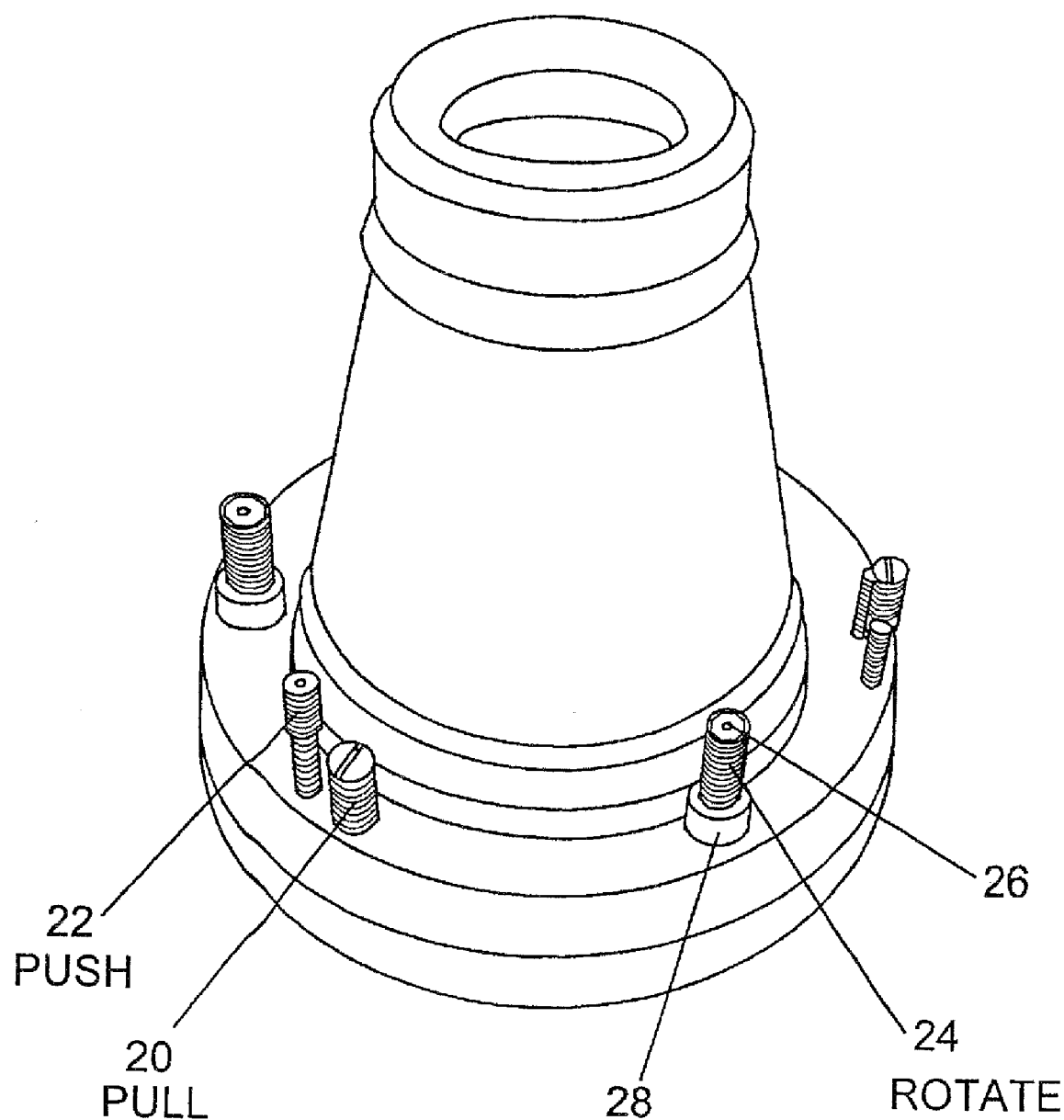
FIG. 4 is an illustration of the light collimating system of the present invention showing external screws used to align the system.

Referring in particular to FIG. 4, pull screws 20 are located on a periphery of adapter ring 5 spaced 120° apart. The adapter ring is shown in detail in FIGS. 6A and 6B. Push screws 22 are located adjacent pull screws 20. Push screws 22 are threadedly mounted in holes 23 (see FIG. 6B) in adapter ring 5 and are also spaced 120 degrees around the periphery of adapter ring 5. Push screws 22 and pull screws 20 are adjusted in tandem, providing a simple means for aligning the axis of the light collimating system with that of the primary mirror.

Figure 6B:
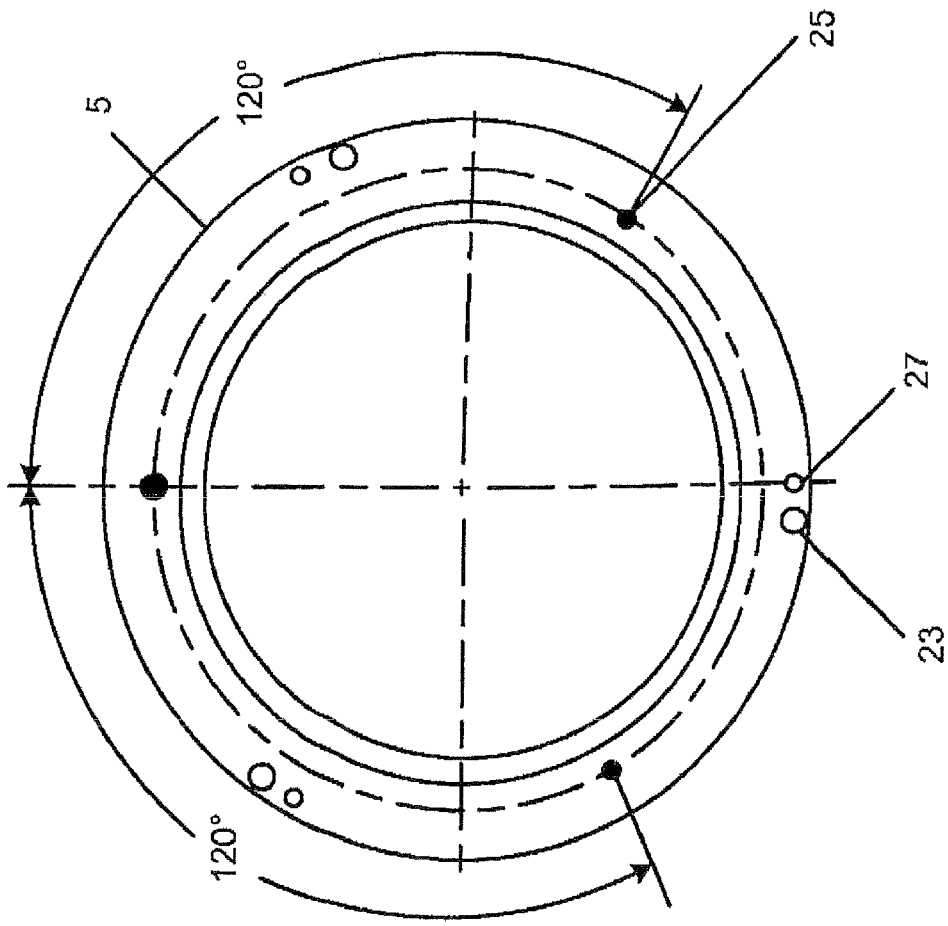
FIGS. 6A and 6B are end and side cross-sectional views of an adapter ring element.
Figure 6A:
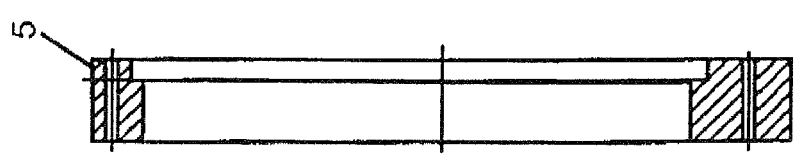

A third set of fixing screws 24 are threadedly mounted into holes 25 in adapter ring 5, located on the periphery of adapter ring 5 and equi-spaced between pull screws 20 (see FIGS. 6A and 6B). Each fixing screw 24 includes a head 26 that is sized to contain a bushing 28 that in turn is sized and shaped to bear down on a flange 15 formed integrally at the proximal end of housing 8 when fixing screw 24 is screwed down. Fixing screws 24 permit rotational alignment of the housing 8 of the light collimating system. Alternatively, the housing may be constructed of two portions wherein only an upper portion of the housing is permitted to rotate.

Figure 7:
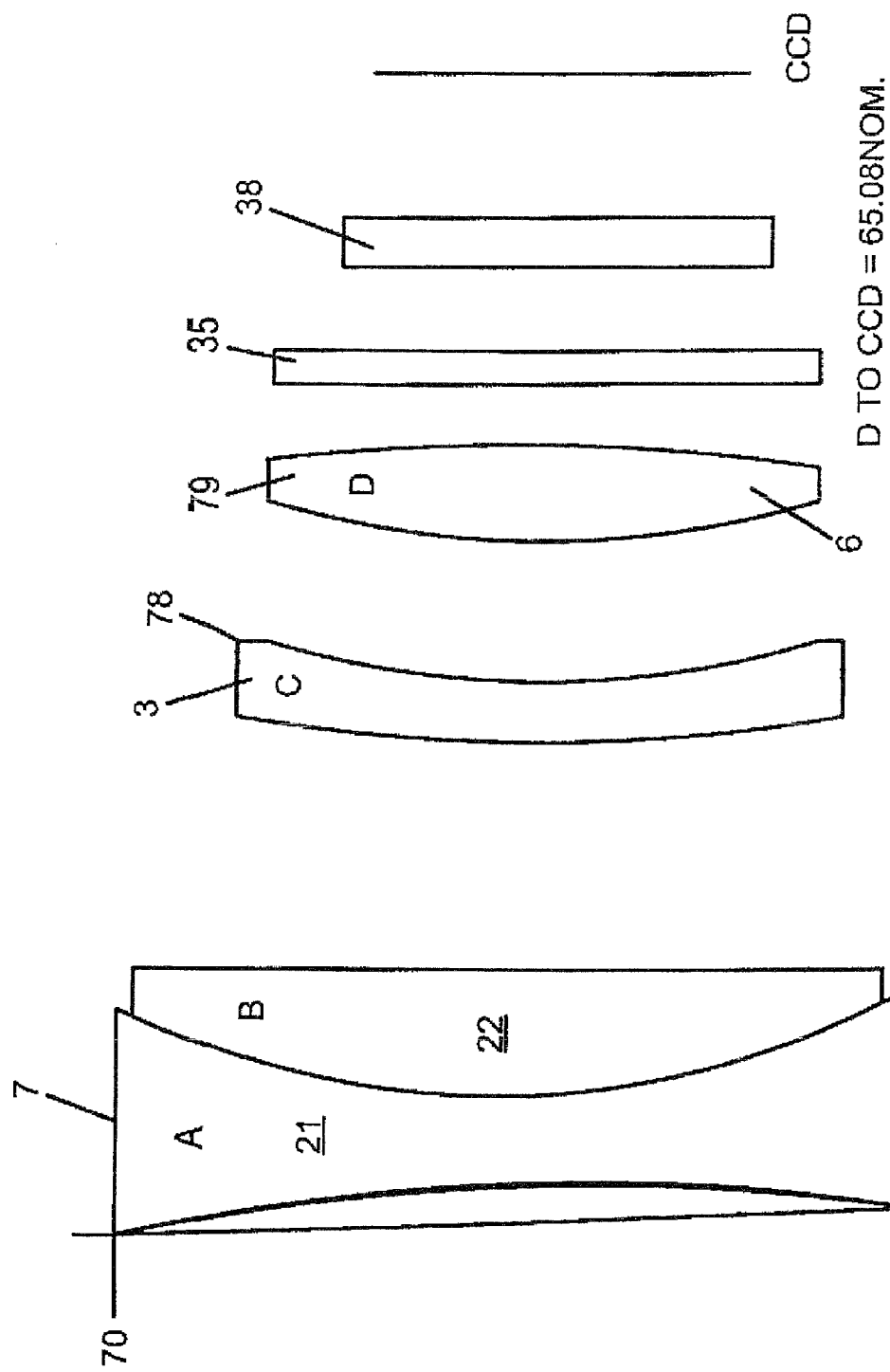
FIG. 7 is a view of the several optical elements making up the light collimating system according to one embodiment of the present invention.

The light collimating system includes a series of lens elements for correcting optical aberrations. Some of these aberrations are normally corrected by the spherical secondary mirror. As shown in FIG. 7, the series of lens elements will be arranged concentrically and will generally include a doublet 7, comprising two lenses A, B of two different materials that are bonded together to form a single lens, a second lens element 3, and a third lens element 6.

Figure 8B:
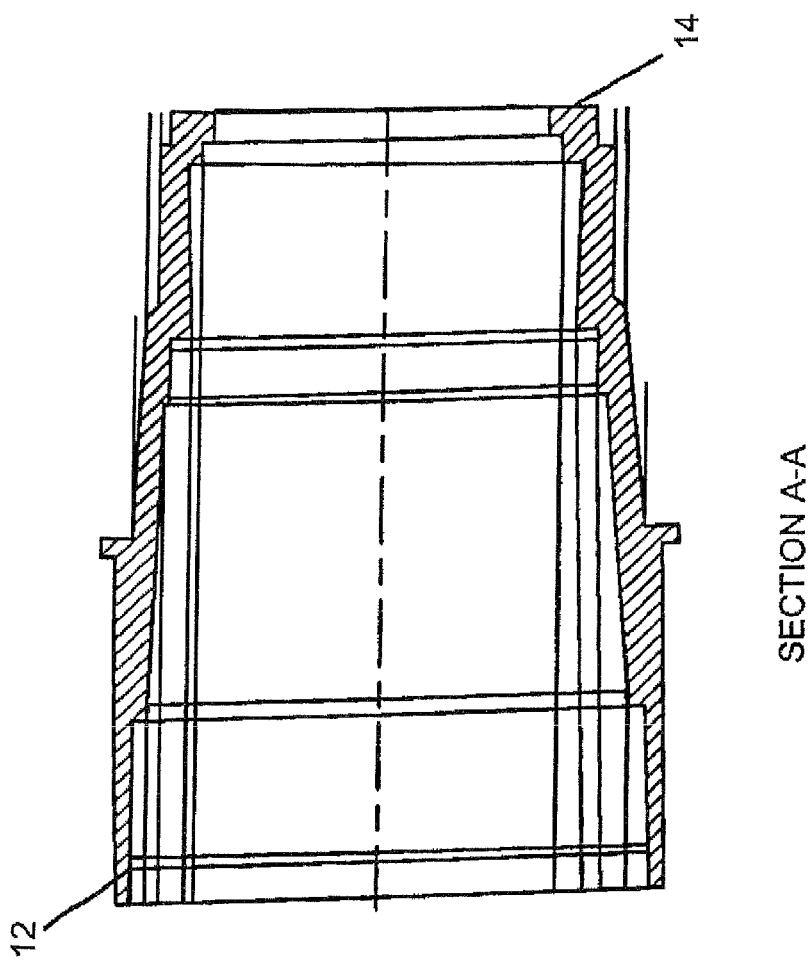
FIGS. 8A and 8B are end and side cross-sectional views of the housing element.
Figure 8A:
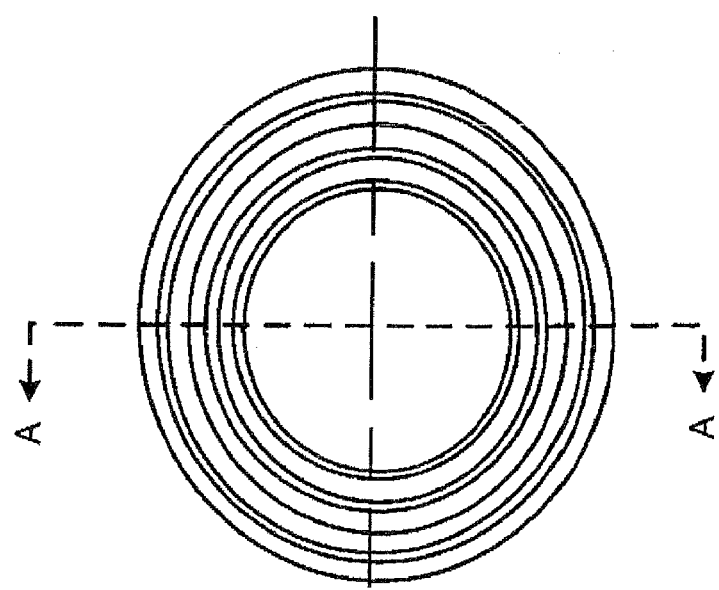

The achromatic doublet 7 corrects for chromatic aberration caused by difference in refractive index for different wavelengths of light. The doublet is bonded together using suitable cements known in the relevant art, such as NORLAND 61. One of the air-glass surfaces of the doublet may be a flat surface and at least one of the surfaces will be concave. Lenses 71 and 72, forming the doublet, will usually have the same diameter. Doublet 7 is held in place between first retainer ring 9, which and first shelf 12, formed on the inner wall of the housing 8. The housing is shown in detail in FIGS. 8A and 8B and the first retainer ring is shown in detail in FIGS. 9A and 9B.

Figure 10B:
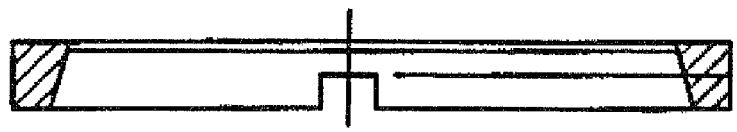
FIGS. 10A and 10B are end and side cross-sectional views of a secondary lens retainer of the present invention.
Figure 10A:
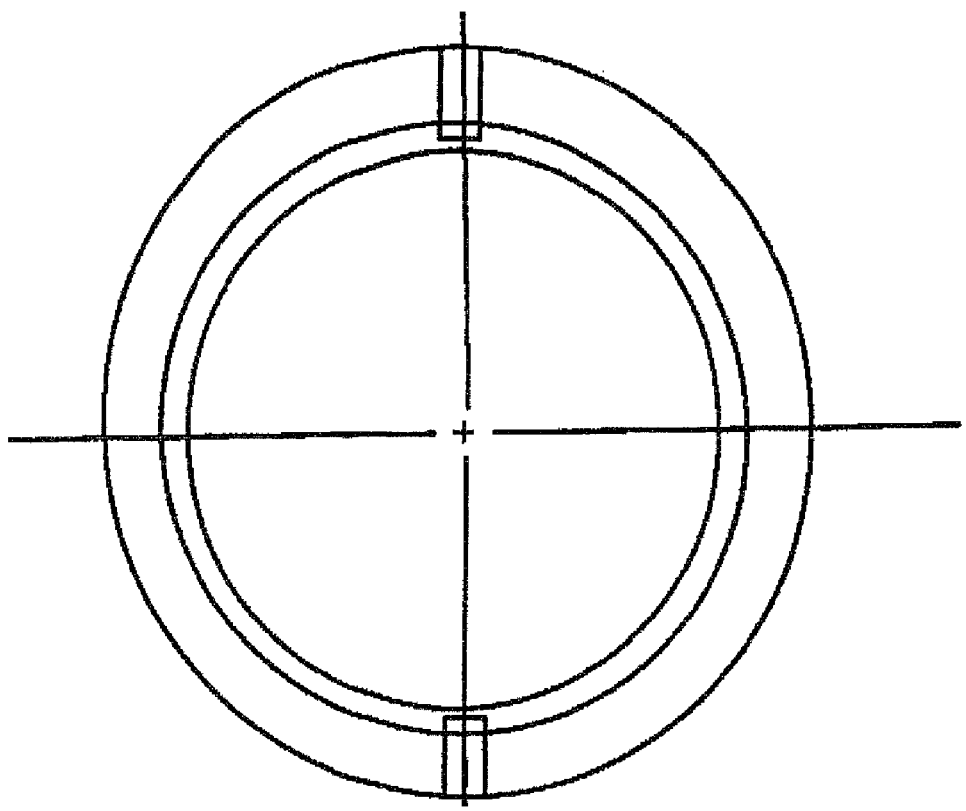

The second lens element 3 further collimates the light after it passes through the doublet and is usually a meniscus lens constructed of a third material. The concave side of the second lens element 3 is beveled flat at the edges to rest against spacer 2 (as shown in FIG. 3). The second lens element 3 is also held in place on the convex side by second retainer ring 4. The second retainer ring is shown in detail in FIGS. 10A and 10B.

Figure 11B:
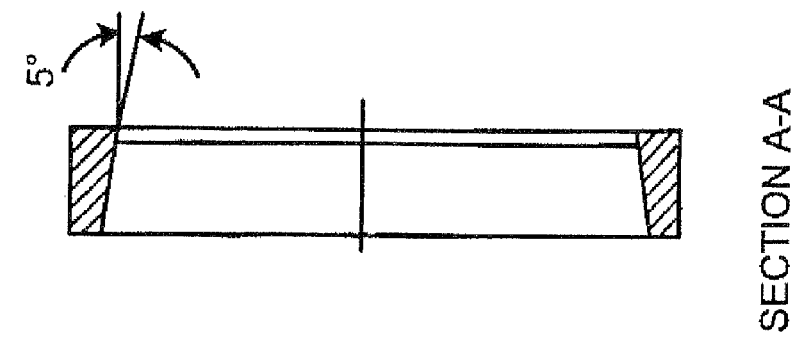
FIGS. 11A and 11B are end and side cross-sectional views of a retainer ring element.
Figure 11A:
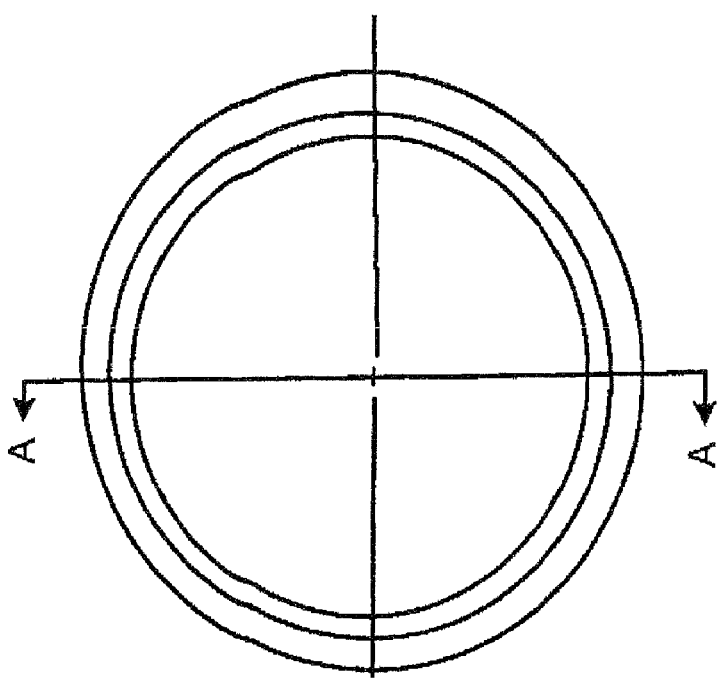

The third lens element 6 focuses the light into the charge-coupled device (CCD) camera. The third lens element 6 may be a bi-convex lens or may be comprised of a doublet formed of two lenses of different materials, similar to doublet 7, save that both air-glass surfaces are convex. The third lens element 6 lens is held in place between spacer 2 and a second shelf 14 of housing 8. The spacer is shown in detail in FIGS. 11A and 11B. One or both surfaces of the third lens element 6 may include flat beveled portions at the edges for convenience of assembly with the spacer and housing second shelf.

The air-glass surfaces of all lens elements should be coated with an anti-reflective material to minimize further aberrations. As shown in FIG. 7, the light collimating system may also include a filter 35 and a glass window 38 between the bi-convex lens and the CCD camera. Moreover, additional lenses may be included to further correct the light before entering the CCD camera if required for a particular SCT design.

Depending on the size and design of the telescope, the focal ratio of the telescope with the light collimating system of the present invention installed will be between f/1.8 and f/2.0. With the light collimating system of the present invention installed, high quality images may be obtained up to 31 times faster than imaging at a typical focal ratio of f/10.

Removing the secondary mirror and installing the light collimating system is very simple according to the present invention. First, the user points the telescope up at about a 45° angle. If using an equatorial mount, the user will simply put the telescope in the normal home position. This position keeps the mirror and lenses from falling out during installation. The user should tighten the clutches to hold the telescope in place.

Figure 12:
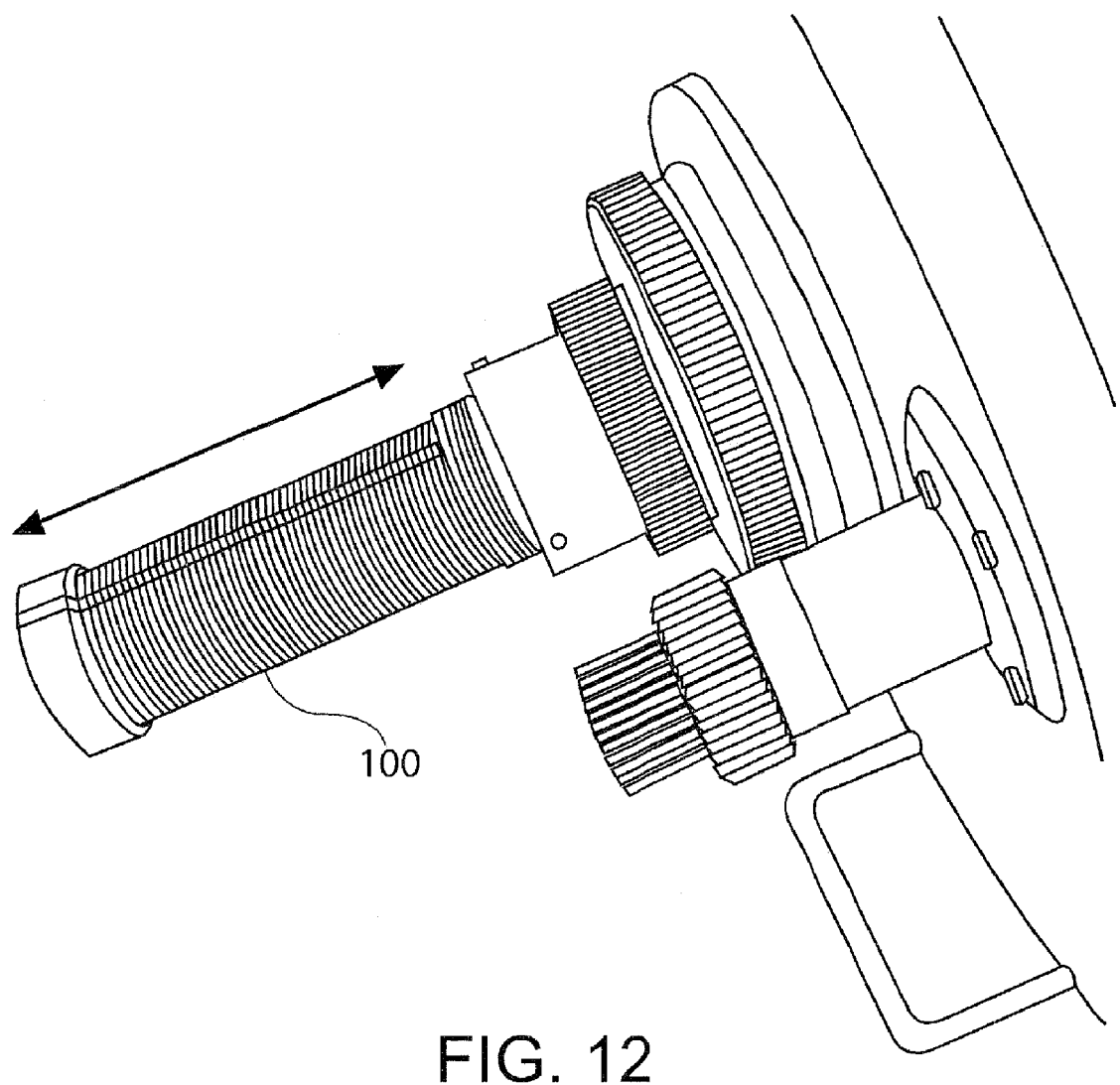
FIG. 12 is an illustration of a counterweight used in connection with the light collimating system of the present invention.
Figure 13:
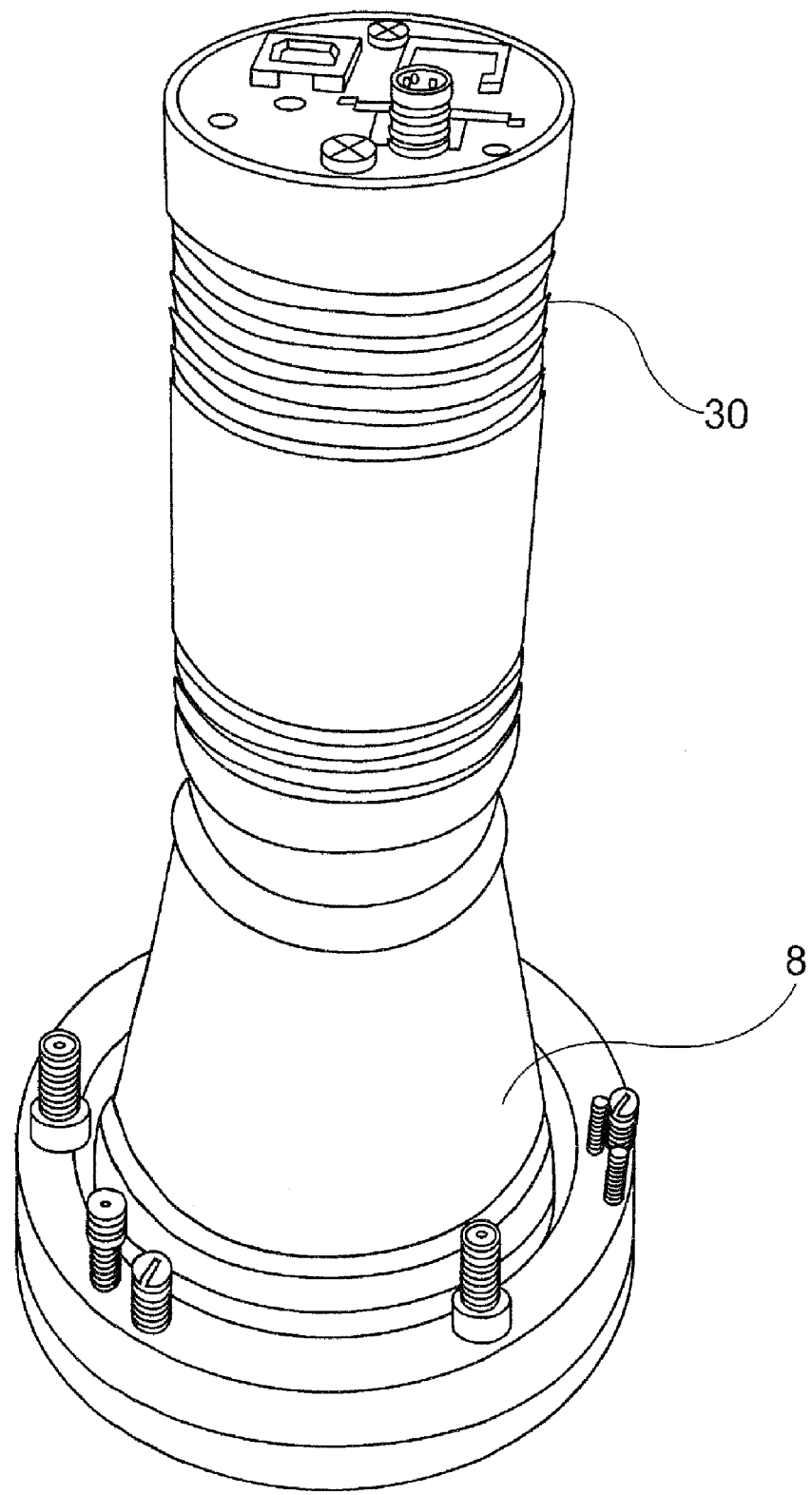
FIG. 13 is an illustration of a charge-coupled device camera installed with the light collimating system of the present invention.

The secondary mirror is easily removed from the corrector plate at the front of the telescope and placed into a holder for protection. The light collimating system lens is then threaded onto the front of the telescope in place of the secondary mirror. The charge-coupled device (CCD) camera 30 is threaded onto the light collimating system. See FIG. 13. If desired, the orientation of the camera can be changed by loosening slightly the three fixing screws 24, turning the camera to the desired orientation, and retightening the screws. For larger SCTs, e.g., at least 14 inches, the system is compatible with digital single-lens reflex cameras (SLRs). A counterweight 28 is installed at the back of the telescope to balance the weight of the light collimating system and camera. See FIG. 12.

Usually, most SCTs are equipped with a large retaining ring from the front of the telescope which must be removed before the secondary mirror assembly can be removed and placed in the protective holder. The large retaining ring may then be threaded onto the protective holder to prevent the secondary mirror from falling out. The secondary mirror is indexed such that when it is replaced in the telescope, collimation is retained and no adjustments are necessary.

The telescope must then be balanced properly to avoid problems during imaging or pointing of the telescope. On a fork-mounted telescope, the counterweight is slid either front to back or back to front to balance the scope. On a German equatorial mount, the optical tube itself is repositioned for balance.

With the light collimating system installed, pointing of the telescope is done using the computer. The camera is run in a low-resolution mode that takes and downloads a new image every second or two. In this way you get an almost real-time view of where the telescope is pointing. Focusing with light collimating system is easy and can be done manually or automatically.

Finding the desired object is also simplified by the present invention. Images may be taken every few seconds and loaded to the computer screen. With just a 1-second exposure, the light collimating system with a typical CCD camera is sensitive enough to allow the camera to pick up almost any deep sky object. In the case of an extremely faint target, the exposure may have to be increased to 5 seconds. Once the object has been located by the telescope, the target object can be framed as desired by either moving the telescope with the directional buttons on the hand control or by rotating the camera using the fixing screws.

Collimating adjustments need only be made if there is a noticeable coma effect (flaring of the star images to one side) on one edge or corner of the field while the rest of the stars appear sharp. This implies the primary mirror is slightly tilted and not perfectly aligned with the optical axis of the light collimating system. This is normally compensated for by adjusting the secondary mirror, but with the mirror removed the coma effect is diminished by properly aligning the light collimating system. This is done by taking a single short exposure of a star field and then by simply adjusting one set of the push screws 22 and pull screws 20. This will tip one side of the light collimating system outward. A second image will reveal if the collimation was successful. If no improvement is seen, a different pair of push and pull screws should be adjusted. It may be necessary to refocus during adjustment to see the best results.

A variety of cameras will work with the light collimating system, but there are some limitations. The camera cannot be too large or it will obstruct too much of the telescope aperture. Thus it follows that, larger telescopes can use larger cameras. Also, the size of the sensor that can be fully illuminated by the light collimating system is dependent on the size of the telescope. Larger scopes allow larger lens elements to be used in the light collimating system, allowing bigger sensors to be illuminated.

Imaging with a one-shot color model eliminates the need to take individual red, green, and blue-filtered exposures to create a color image. The color rendition obtained from a one-shot color camera is very accurate. While color cameras tend to be less sensitive than monochrome models, there are two aspects of the present invention that make this difference less significant. First, the total time spent imaging is not increased because the color camera does not require as many images. Second, and most importantly, is that the exposure times are so short with the light collimating system that any overall time difference is minimized. Even where narrowband imaging is desired to provide greater detail, exposures are still only a few minutes long, instead of the hours it might take with a much slower system.

Flat field images are not generally required with the light collimating system, but may be useful to remove vignetting that may occur due to the fast focal ratios.

Figure 14:
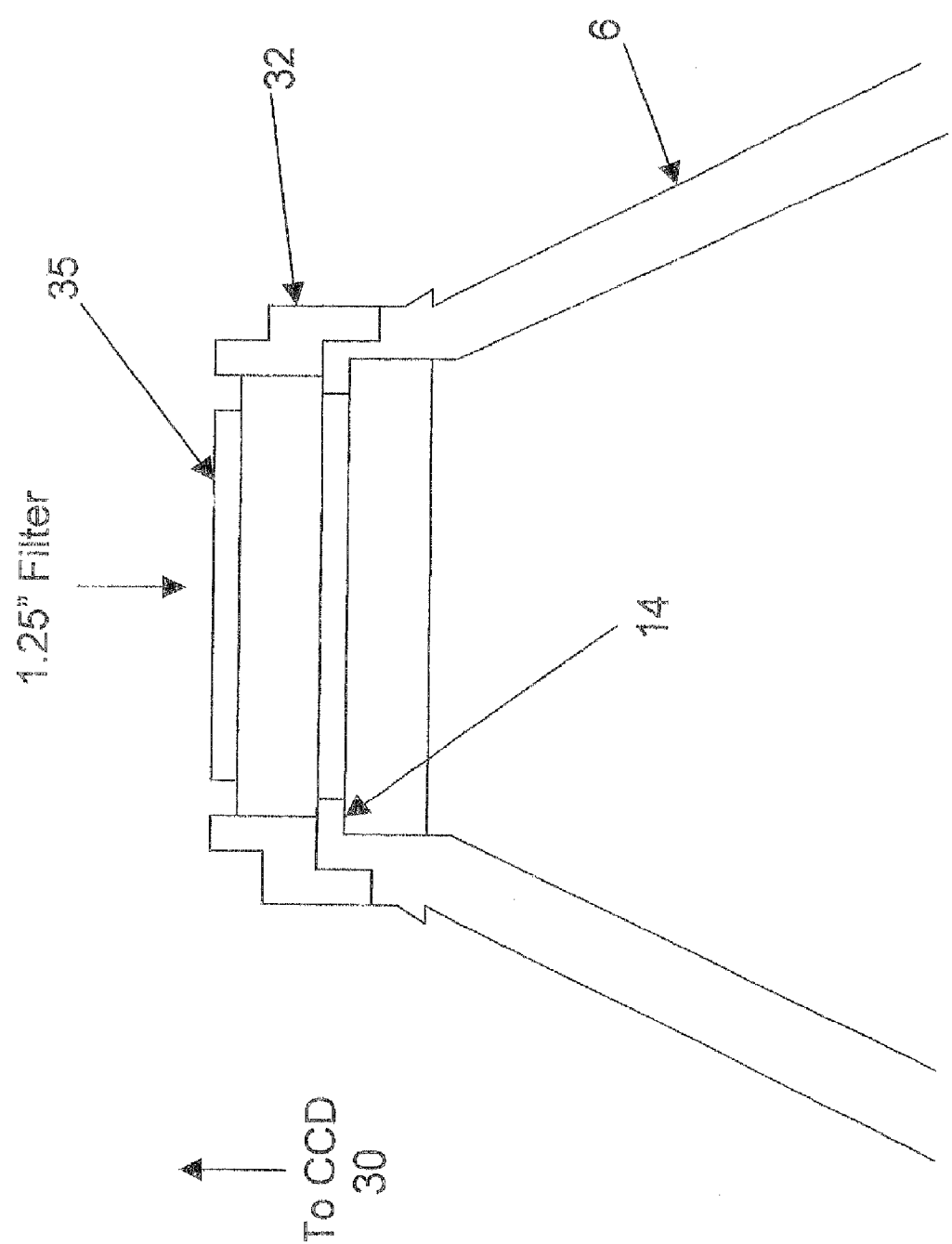
FIG. 14 is a side cross-sectional view of a filter and spacer according to an alternative embodiment of the present invention.

It is possible to use a filter, such as a 1.25 inch Hydrogen-Alpha (H-alpha) or Light Pollution Reduction (LPR) filter 35, with the light collimating system. Referring to FIG. 14, the filter is placed inside a camera spacer 32 and rests on the second shelf 14 retaining the third lens element 6 in the light collimating system. The threads should point toward the CCD camera for correct orientation. It is important to note that systems with very fast focal ratios usually require a wider bandpass than narrowband filters.

The invention is described below in reference to installation on commercially available Schmidt-Cassegrain telescopes (SCTs) with readily replaced secondary mirrors. The lenses are preferably customized for each specific design as slight differences in design, such as the primary mirror, must be compensated for in the lenses of the present invention.

Example 1

The present invention was optimized and assembled with an 14 inch CELESTRON® SCT and is shown in FIG. 7. The optical assembly comprised four lenses, a filter, and a flat glass window. The first lens 71 is biconvex and the second lens 72 is plano-convex. Lenses 71 and 72 are bonded together forming a doublet. Lens A includes a flat bevel 77 on the weaker face for resting against the first retainer ring. Line 70 indicates the position relative to the corrector plate of the SCT. Middle lens 3 is a negative meniscus lens with a flat beveled edge 75 having 0.5 mm wide. Final lens 6 is a bi-convex lens with a flat beveled edge 78 having 0.5 mm wide. The materials from which each lens is made and the radius of each lens surface is listed in Table 1. The distance from the front surface of lens 71 to the CCD camera is 65.8 mm. Attaching the light collimating system to the 11 inch CELESTRON® SCT reduces the focal ratio from f/11 to f/1.9. Equivalent exposure times were reduced by a factor of 28. When used with a CANON EOS® 20 Da camera, the field of view covered 1.91°×1.27° with a resolution of 1.95 arc-seconds/pixel.

TABLE 3

Light Collimating System Lenses for the 14 inch CELESTRON ® SCT

| Lens | Radius | Thickness | Diameter | Material |
| --- | --- | --- | --- | --- |
| Lens 71 | −334.7°; 106.45° | 8 mm | 88 mm | S-BSL7 |
| Lens 72 | 106.45°; infinity | 13 mm | 86 mm | S-TIM2 |
| Middle Lens 3 | 129.46°; 71.94° | 6 mm | 68 mm | S-TIH4 |
| Final Lens 6 | 106.45°; −238° | 11 mm | 62 mm | S-BSL7 |

Example 2

Figure 15:
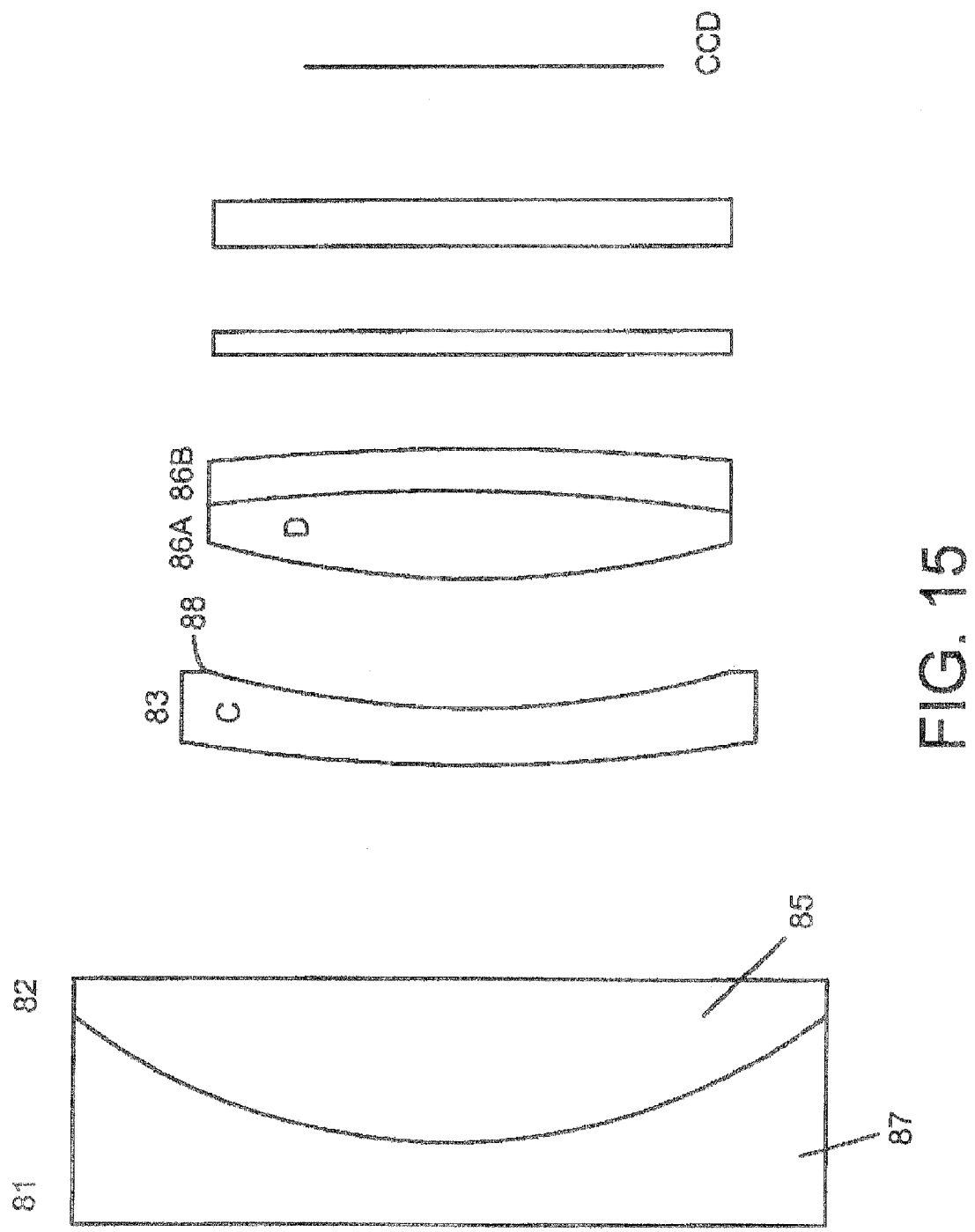
FIG. 15 is a cross-sectional view of the light collimating system in accordance with one embodiment of the present invention.

The present invention was optimized and assembled with an 8 inch CELESTRON® SCT. The optical assembly comprised five lenses, a filter, and a flat glass window. As shown in FIG. 15, the first lens 81 is plano-concave and the second lens 82 is a positive meniscus. Lenses 81 and 82 are bonded together forming a doublet. The position of the light collimating system is such that the front face of lens 81 is 13 mm inside of the corrector plate. Middle lens 83 is a negative meniscus lens with a flat beveled edge 88 having 0.5 mm wide. Final doublet 86 is comprised of two lenses. Lens 86A is a biconvex lens with a flat beveled edge 89 having 0.5 mm wide and lens 86B which is a negative meniscus. The materials from which each lens is made and the radius of each lens surface is listed in Table 2. The distance from the front surface of lens 81 to the CCD camera is 35 mm. Attaching the light collimating system to the 11 inch CELESTRON® SCT reduces the focal ratio from f/10 to f/2.1. Equivalent exposure times were reduced by a factor of 25.0.

TABLE 2

Light Collimating System Lenses for the 8 inch CELESTRON ® SCT

| Lens | Radius | Thickness | Diameter | Material |
| --- | --- | --- | --- | --- |
| Lens 81 | infinity; 51.23° | 5 mm | 48 mm | S-BSL7 |
| Lens 82 | 51.23°; 143.1° | 8 mm | 48 mm | PBM2 |
| Middle Lens 83 | 80.88°; 51.23° | 4 mm | 42 mm | PBH4 |
| Lens 86A | 63.7°; −63.7° | 9 mm | 40 mm | S-BSL7 |
| Lens 86B | −63.7°; −154.69° | 3 mm | 40 mm | PBM2 |

Example 3

Figure 16:
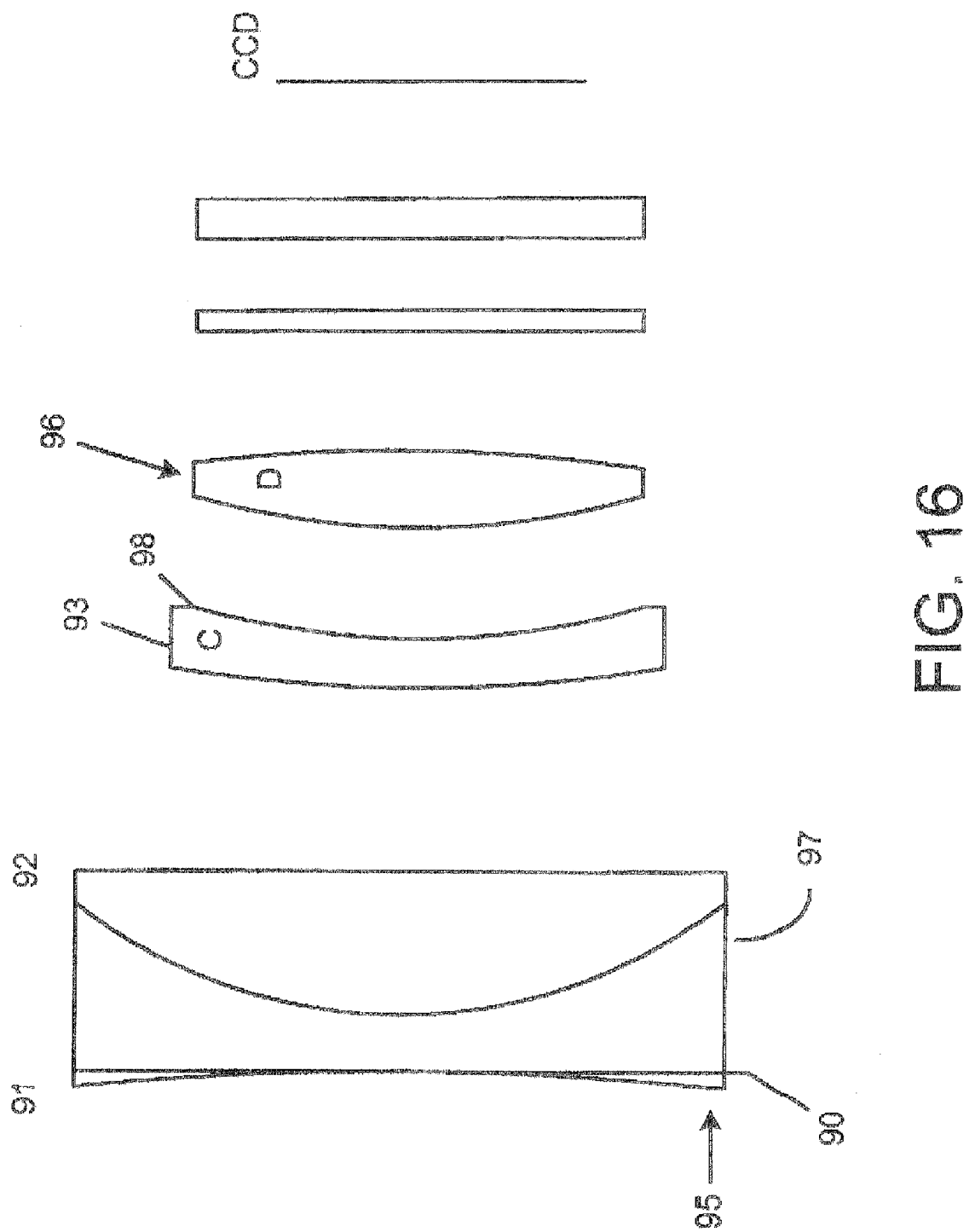
FIG. 16 is a cross-sectional view of the light collimating system in accordance with one embodiment of the present invention.

The present invention was optimized and assembled with an 11 inch CELESTRON® SCT. The optical assembly comprised four lenses, a filter, and a flat glass window. As shown in FIG. 16, the first lens 91 is biconcave and the second lens 92 is plano-convex. Lenses 91 and 92 are bonded together forming a doublet. Lens 91 includes a flat bevel 95 on the front face. Line 90 indicates the position relative to the corrector plate of the SCT. Middle lens 93 is a negative meniscus lens with a flat beveled edge 98 having 0.5 mm wide. Final lens 96 is a biconvex lens with a flat beveled edge 99 having 0.5 mm wide. The materials from which each lens is made and the radius of each lens surface is listed in Table 1. The distance from the front surface of lens 91 to the CCD camera is 51.9 mm. Attaching the light collimating system to the 11 inch CELESTRON® SCT reduces the focal ratio from f/10 to f/1.8. Equivalent exposure times were reduced by a factor of 30.9.

TABLE 1

Light Collimating System Lenses for the 11 inch CELESTRON ® SCT

| Lens | Radius | Thickness | Diameter | Material |
| --- | --- | --- | --- | --- |
| Lens 91 | −387.9°; 124.42° | 5 mm | 74 mm | S-BSL7 |
| Lens 92 | 124.42°; infinity | 10 mm | 74 mm | S-TIM2 |
| Middle Lens 93 | 136.94°; 62.49° | 5 mm | 58 mm | S-TIH4 |
| Final Lens 96 | 79.5°; 176° | 11 mm | 58 mm | S-BSL7 |

It should be emphasized that the above-described embodiments of the present system are merely possible examples of implementations and merely set forth for a clear understanding of the principles of the invention. Many different embodiments of the light collimating system described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

The invention claimed is:

1. A light collimating system for mounting at the focus of a primary mirror of a Schmidt-Cassegrain telescope, comprising:
    a housing with a distal end designed for the attachment of an optical imaging device;
    a plurality of lens elements contained within the housing and arranged concentrically about the axis of the primary mirror, wherein at least one lens element comprises an achromatic doublet;
    an adapter ring attached to the housing; and
    a mounting ring attached to the adapter ring by a set of screws.

2. The system of claim 1, wherein the light collimating system replaces the secondary mirror of a Schmidt-Cassegrain telescope.

3. The system of claim 1, wherein the plurality of lens elements includes a first lens element, a second lens element, and a third lens element, the first lens element comprising an achromatic doublet.

4. The system of claim 1, wherein the plurality of lens elements are optimized to reduce optical aberrations.

5. The system of claim 1, wherein the housing includes a first shelf, and wherein said first lens element is held between said first shelf and a first retaining ring.

6. The system of claim 1, further comprising a second shelf at the back end of said housing, a spacer and a second retaining ring, wherein the second lens element is held in place between the second retaining ring and the spacer, and wherein the third lens element is held in place between the spacer and the second shelf.

7. The system of claim 1, wherein one or more of the lens elements are beveled flat on the edge of at least one side.

8. The system of claim 1, further comprising a filter.

9. The system of claim 8, further comprising a spacer between the housing and the optical imaging device, wherein the filter is held against the distal end of the housing by the spacer.

10. The system of claim 1, wherein the optical imaging device is a charge-coupled device camera.

11. The system of claim 10, wherein the optical imaging device is a digital single-reflex camera.

12. The system of claim 1, wherein the Schmidt-Cassegrain telescope with the light collimating system has a focal ratio of about f/2.

13. A light collimating system for a Schmidt-Cassegrain telescope, comprising:
    a housing mounted in place of a secondary mirror of the telescope, the housing containing a plurality of lens elements, wherein the housing at a distal end is designed for the attachment of an optical imaging device;
    an adapter ring attached to the housing;
    a mounting ring attached to the adapter ring by a first set of screws; and
    a second set of screws placed for maintaining the relative positions of the mounting ring and the adapter ring, the first set of screws and second set of screws forming a means of aligning the axis of the plurality of lens elements with the axis of the primary mirror of the telescope.

14. The system of claim 13, further comprising a third set of screws which allow the housing to rotate about the axis when loosened.

15. A Schmidt-Cassegrain telescope having installed thereon a light collimating system as claimed in claim 1.

16. A Schmidt-Cassegrain telescope having installed thereon a light collimating system as claimed in claim 13.

* * * * *